United States Patent [19]

Barthold

[11] Patent Number: 5,436,818
[45] Date of Patent: Jul. 25, 1995

[54] FULL WAVE BUCK-BOOST POWER CONVERTER WITH BUCK POWER CONVERTER PROPERTIES

[76] Inventor: Fred O. Barthold, 1873 Wilstone Ave., Leucadia, Calif. 92024

[21] Appl. No.: 196,398

[22] Filed: Feb. 14, 1994

[51] Int. Cl.$^6$ .................................. H02M 3/335
[52] U.S. Cl. .............................. 363/21; 363/101
[58] Field of Search ............ 363/101, 21, 24, 98, 363/133, 134; 307/83

[56] References Cited

U.S. PATENT DOCUMENTS

| | | | |
|---|---|---|---|
| 4,972,292 | 11/1990 | Petersen | 363/21 X |
| 5,088,017 | 2/1992 | Yaginuma et al. | 363/21 |
| 5,262,933 | 11/1993 | Shyi-Hon | 363/21 X |

*Primary Examiner*—Steven L. Stephan
*Assistant Examiner*—E. To
*Attorney, Agent, or Firm*—Gilliam, Duncan & Harms

[57] ABSTRACT

A continuous mode full wave power converter topology which integrates the buck-boost (flyback) and buck converter properties. The voltage transfer function is $M=(D/(1-D))$, characteristic of the buck-boost (flyback) converter. Characteristic of the full wave buck converter, the inductor current is source continuous during the alternate D intervals, source discontinuous during the simultaneous $(1-D)$ intervals, and load continuous during both the D and $(1-D)$ intervals.

4 Claims, 7 Drawing Sheets

$n = \dfrac{N_0}{N_t} = .5$ $M = \dfrac{nD}{1+D(n-1)}$ $D = \dfrac{t_{ON}}{T/2}$

FULL WAVE BUCK-BOOST POWER CONVERTER WITH BUCK POWER CONVERTER PROPERTIES

BACKGROUND OF THE INVENTION

1. Field of the Invention

The invention relates to switchmode power converters. In particular, the invention relates to switchmode power converters in which characteristics and properties of the fundamental buck or boost converter forms are advantageously integrated. More particularly, the invention relates to the advantageous integration of the previously integrated buck-boost converter form with the fundamental buck converter form.

2. Discussion of Prior Art

Three basic circuit families are commonly used in switchmode power supplies; namely, buck, boost, and buck-boost (commonly known as "flyback"). The buck-boost (flyback) converter is probably the earliest example of advantageous integration of the fundamental buck and boost converter forms. Although some authority treats the buck-boost converter as a fundamental form, another body of opinion holds that the buck-boost converter is an integrated form.

Whatever the genesis of the buck-boost converter form, there is consensus of authority regarding a topological property of the continuous mode control-to-output transfer function of both the buck-boost converter form, $M=D/(1-D)$, and the boost converter form, $M=1/(1-D)$. This consensus holds that there is present in ALL continuous mode, PWM controlled, fixed frequency, switch mode boost and buck-boost converter forms a non-minimumphase property, the right half s-plane zero. Dubbed the RHP zero, this first-order property is attributable to the inductor current/load current discontinuity consequential to the $(1-D)$ term. This RHP zero never occurs in circuits of the buck family. Further consensus holds that this RHP zero is a disadvantageous property, as manifested in either the fundamental boost converter form or the integrated buck-boost converter form, since either stability or dynamic response is severely compromised. This RHP zero has been addressed with wry humor "A right-half-plane zero is included in every boost-derived converter transfer function at no extra cost.", a measure of vituperation "... very nasty right half plane zero ... ", and a sort of despair ". . . impossible to compensate. The non-existence of a buck-boost (flyback) converter form equivalent to the full-wave buck (forward) converter form has been asserted. Diverse efforts to mitigate this RHP zero include discontinuous mode operation, leading edge modulation, power and control component value manipulation, and average current mode control techniques. Contemporary converter control loop compensation teaching extensively addresses the need for effective containment of this RHP zero effect.

Postulated in 1967, and analytically confirmed in 1972, this RHP zero effect has been the subject of continuous and intense scrutiny for more than two decades. The justification for this effort is found in the collective of advantageous properties of the buck-boost converter form, among which are simplicity, ease of multiple-output implementation, the compound voltage transfer function, wide input line range, reduced semiconductor stress, load protection, and the same power densities and efficiencies as forward (buck) converters.

This RHP zero effect notwithstanding, the buck-boost converter form (flyback) has found widespread usage in power conversion applications, with proprietary work in both single-ended and full-wave configurations as well as extensive public domain effort.

The foregoing discussion, along with well established application criteria, makes it abundantly clear that the already very popular buck-boost converter form would find substantially greater utility if this RHP zero effect were eliminated.

SUMMARY OF THE INVENTION

The invention is a continuous mode, full wave, buck-boost (flyback), PWM controlled, fixed frequency, switch mode power converter in which a single flux permutation medium (energy storage inductor) is so interposed (coupled) between alternating (transformed) source-to-load switching means as to simultaneously provide the canonical buck-boost converter voltage transfer function, $M=D/(1-D)$, as well as the characteristic full wave buck inductor current coupling properties of being source continuous during the alternate D intervals, source discontinuous during the simultaneous $(1-D)$ intervals, and load continuous during both the alternate D and simultaneous $(1-D)$ intervals.

Since the RHP zero never occurs in circuits of the buck family, this converter topology does not exhibit the characteristic boost-derived RHP zero described in the Discussion of Prior Art, while retaining all other intrinsic full wave buck-boost properties. Responsive to conventional control means, loop bandwidth is limited only by the theoretical sampling rate maxima.

The entire power magnetic function, i.e., both inductance and transformation (isolation), may be obtained in a single magnetic component, the flyback equivalent of the full wave forward converter with a single transformer core.

BRIEF DESCRIPTION OF DRAWINGS

Details of the invention, and of preferred embodiments thereof, will be further understood upon reference to the drawings, wherein.

DETAILED DESCRIPTION OF PREFERRED EMBODIMENTS

For the purpose of explanation of the invention, assume ideal switches, unidirectional conducting devices, and magnetics. The idealized magnetic properties include the conventional low reluctance magnetic core structure for the transformers T11 and T12, hereinafter discussed, and the conventional relatively higher reluctance magnetic core structure for L so realized as to obtain the requisite ampere turns (magnetomotive force) identity. The M term is the ideal voltage transfer ratio, expressed in terms of D. The D term is a switch closed period $t_{ON}$, expressed as a fraction of (T). The (T) term is one full wave cycle of operation, expressed as an arbitrary time unit of one.

Figure 3:
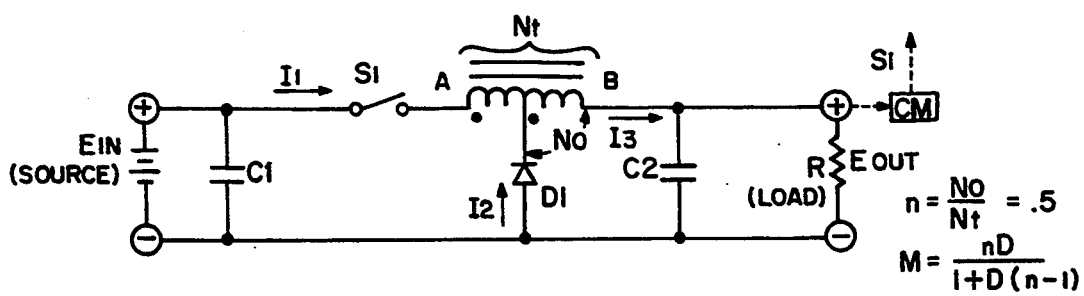
FIG. 3 illustrates schematically a prior art buck-derived converter form, with attendant voltage, current, and transfer function identities.
Figure 3A:
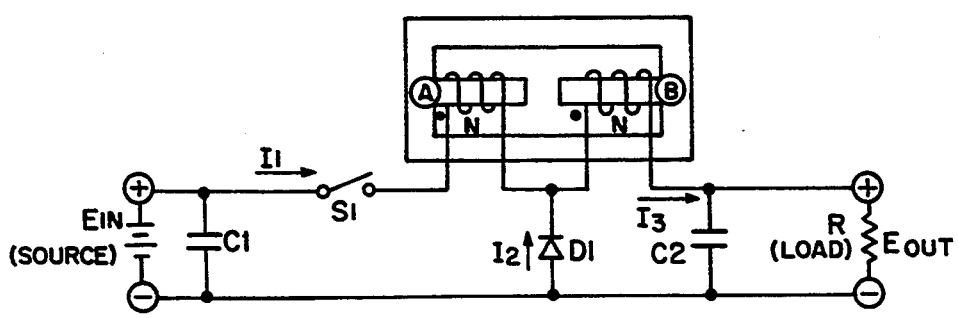
FIG. 3A illustrates the magnetic structure of FIG. 3, with attendant voltage and current identities.
Figure 6:
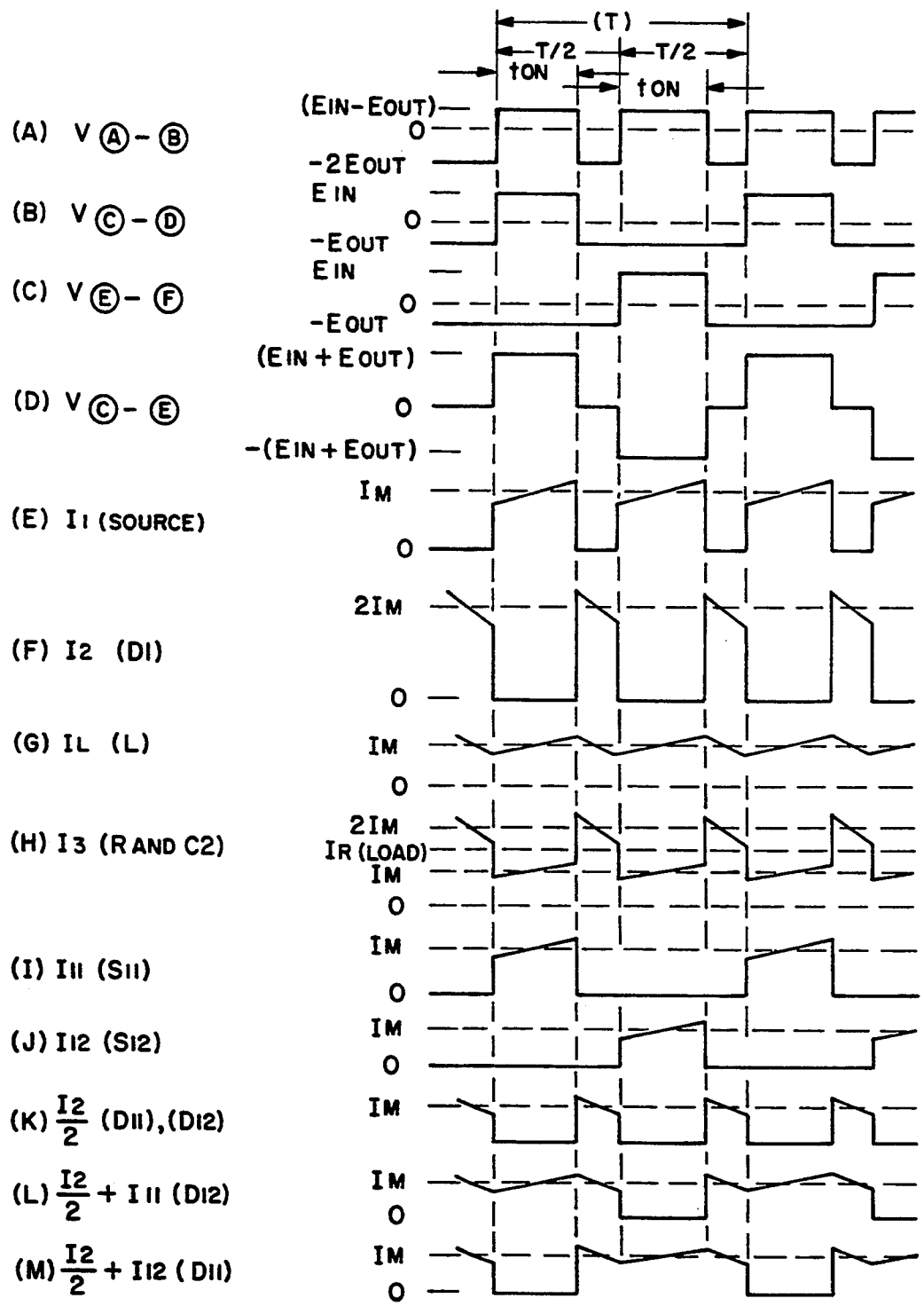
FIG. 6 is a plurality of graphs illustrating the timing, voltage, and current identities of FIG. 3, 3A, 4, 4A, 5, 5A, 7, 7A, 8, 8A, 9, and 9A, with attendant timing, voltage, and current summation expressions.

1. Referring now to FIG. 3 and 3A, the timing, voltage, and current identities are expressed in (T)(A)(E)(F) and (H) of FIG. 6, with the attendant timing, voltage, and current expressions. Given n=0.5, it is seen that application of alternating (full-wave) switch means to the voltage transfer function of the prior art buck-derived circuit of FIG. 3 will express the 2D term, i.e., $M = n2D/\{1+2D(n-1)\} = 0.5(2D)/1+2D(-0.5) = D/(1-D)$. This expression is precisely analogous to the conventional full-wave buck converter in which the D term, as applied to each switch, is effectively doubled by the Et equivalency characteristic of the full wave buck inductor, i.e., in steady state operation, the voltage across the inductor, averaged over each switching cycle must be zero. $\{(Ein - Eout)2D\} + \{-Eout(1-2D)\} = 0$, $2DEin - Eout+ = 0$, $2DEin - Eout = 0$, $Eout = 2DEin$, $M = 2D$.

Figure 7:
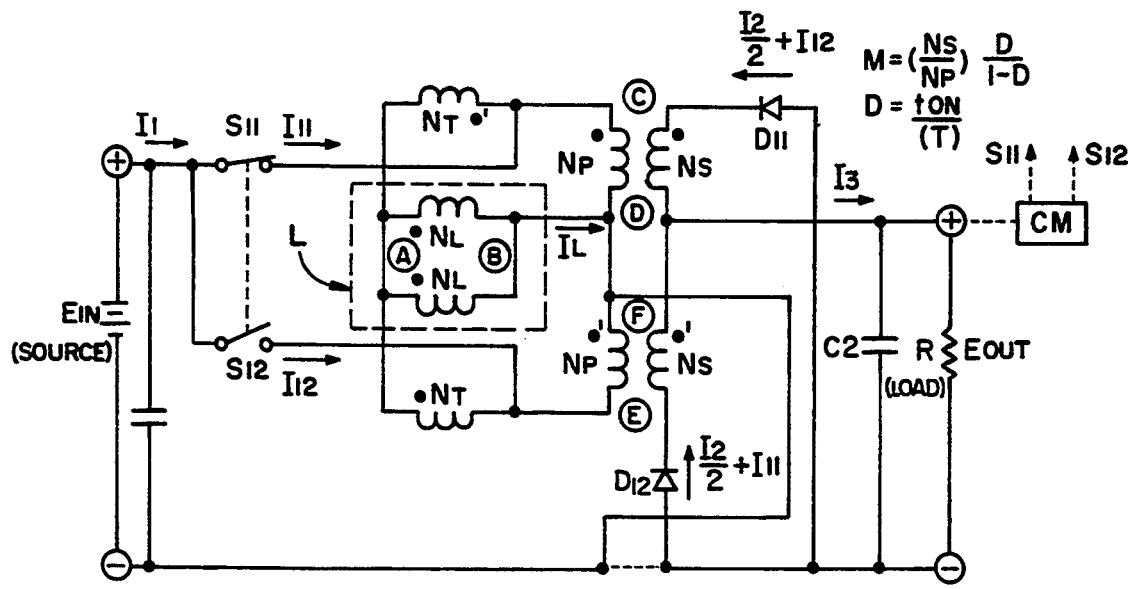
FIG. 7 illustrates schematically an isolated, three magnetic converter embodiment of the invention, with attendant voltage, current, and transfer function identities.
Figure 7A:
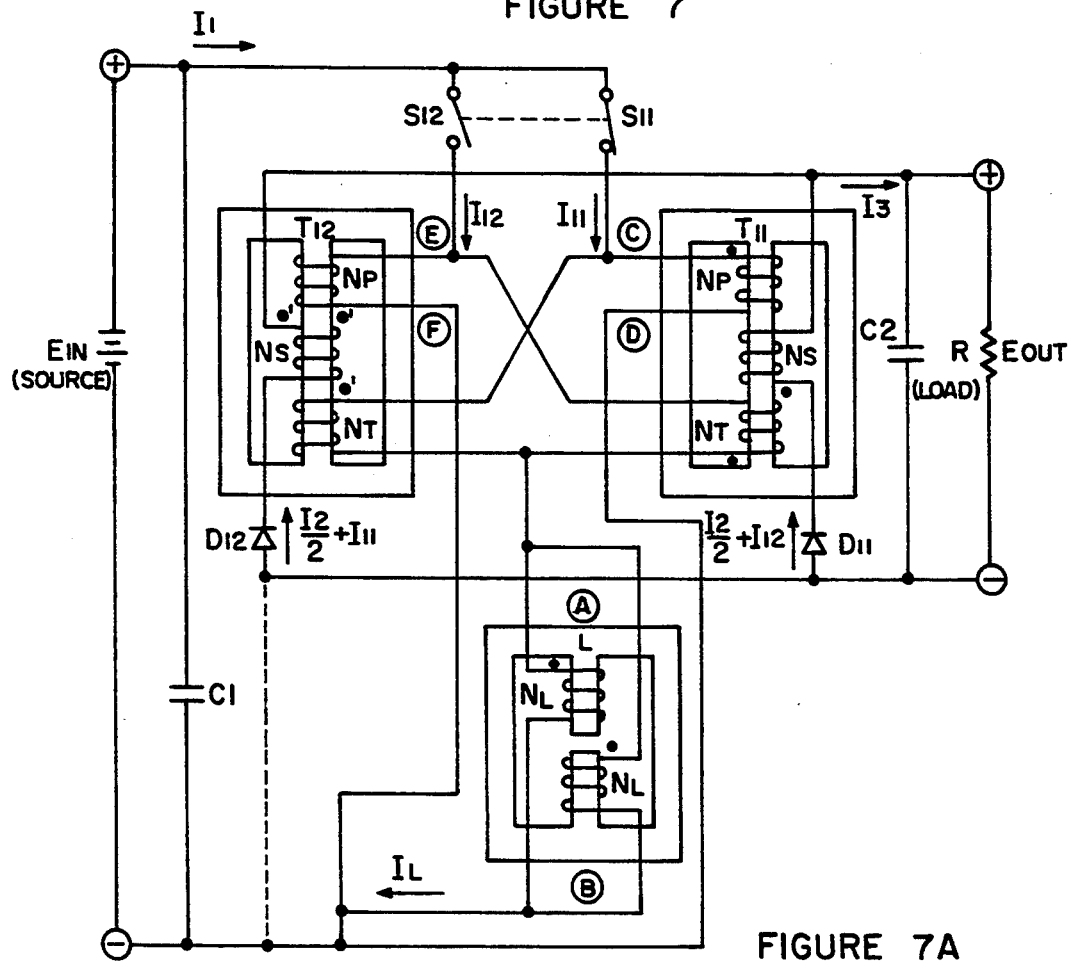
FIG. 7A illustrates the magnetic structure of FIG. 7, with attendant voltage and current identities.

2. Referring now to FIG. 7 and 7A, the timing, voltage and current identities are expressed in (T), (A), (B), (C), (D), (E), (F), (G), (H), (I), (J), (K), (L), and (M) of FIG. 6, with the attendant timing, voltage, and current expressions.

Alternate closure $t_{ON}$ of switch S11 or S12 will express Ein and the discontinuous source current integrating capacitor C1 across $N_P$, $N_T$, and $N_S$ of the corresponding transformer T11 or T12. The corresponding unidirectional conducting means D11 or D12 will be non-conducting. Combined transformer and inductor action will express Eout across $N_P$, $N_T$, and $N_S$ of the non-corresponding transformer T11 or T12 via the conducting non-corresponding unidirectional conducting means D11 or D12. The series combination of $N_P$ of T11 with $N_T$ of T12 and the series combination of $N_P$ of T12 with $N_T$ of T11 are configured and polarized to express the voltage Ein minus Eout, i.e., voltage (A) during either $t_{ON}$ interval. These series combinations are connected in parallel across the inductor L, thus interposing the inductor L in series between Ein and Eout, via the conducting non-corresponding unidirectional conducting means D11 or D12. The inductor L current (G) is continuous with the source current (E), either switch current (I) or (J), either non-corresponding unidirectional conducting means current (L) or (M), and output current (H), during either $t_{ON}$ interval.

Simultaneous opening of switch S11 and S12 will permit polarity reversal of the voltage (A) in consequence of conventional ampere turns (magnetomotive force) conservation in inductor L. Unidirectional conducting means D11 and D12 both conduct, expressing the voltage Eout across $N_S$ of T11 and $N_S$ of T12, which voltage Eout is expressed across the inductor L by the T11 and T12 transformation ratio $(N_P+N_T)/N_S$, or 2:1. The voltage (A) is $-2Eout$ during either $(T/2-t_{ON})$ interval. The Et equivalency of the full-wave flyback inductor L of FIG. 7A is expressed as $\{(Ein - Eout)2D\} + \{ + 2Eout(1-2D)\} = 0$, $2DEin - 2DEout - 2Eout + 4DEout = 0$, $DEin - Eout + DEout = 0$, $DEin + DEout = Eout$, $DEin = Eout - DEout$, $EinD = Eout (1-D)$, $Eout = Ein \{D/(1-D)\}$, $M = D/(1-D)$, again taking the D term as alternately applied to the switch means. The inductor L current (G) is parallel transformed to output current (H) by the ratio $N_S/(N_P+N_T)$, or 1:2. Each unidirectional conducting means conducts current (K), the sum of which currents is current (F). The inductor L current (G) is simultaneously continuous with each unidirection conducting means current (K) and the output current (H) during either $(T/2-t_{ON})$ interval. The inductor L current (G) is source continuous during the on interval $t_{ON}$ of either switch means S11 or S12, source discontinuous during the simultaneous off interval $(T/2-t_{ON})$ of switch means S11 and S12, and output continuous during both the ton and $(T/2-t_{ON})$ intervals. Accordingly, $I_L=I_M$, $I_{R(LOAD)}=2DI_M+(1-2D)2I_M$, $I_{R(LOAD)}=2I_M\{D+(1-2D)\}$, $I_{R(LOAD)}=2I_M(1-D)$, $I_M=0.5I_{R(LOAD)}/(1-D)$. Integrated by capacitor C2, the continuous inductor L current (G)/output current (H) is delivered as $I_{R(LOAD)}$, thus expressing Eout across the utilization load $R_{(LOAD)}$.

Figure 8:
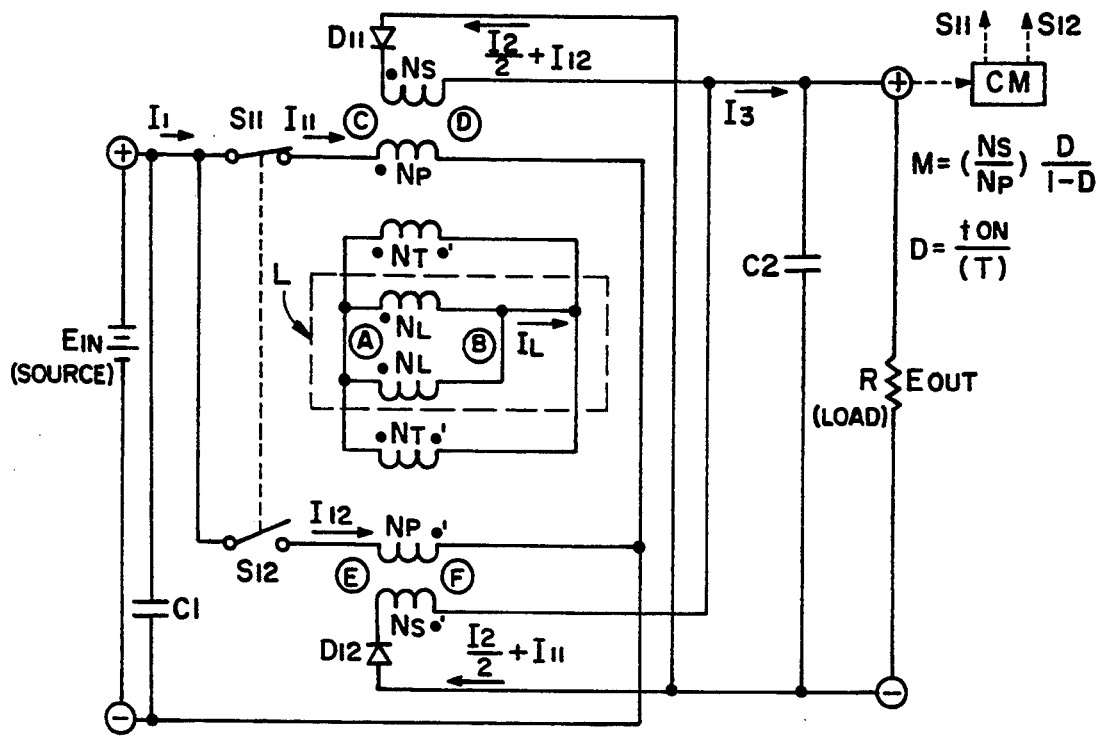
FIG. 8 illustrates schematically an isolated, two magnetic converter embodiment of the invention, with attendant voltage, current, and transfer function identities.
Figure 8A:
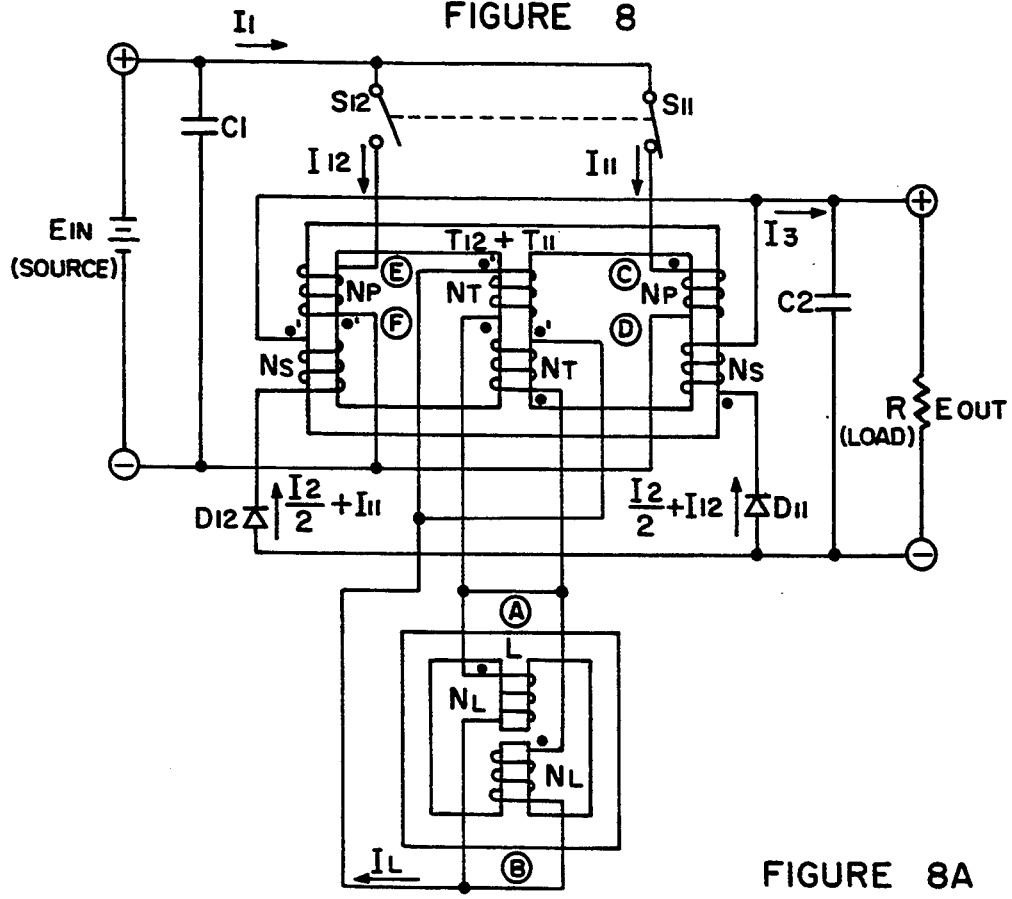
FIG. 8A illustrates the magnetic structure of FIG. 8, with attendant voltage and current identities.

3. Referring now to FIG. 8 and 8A, the timing, voltage and current identities are expressed in (T), (A), (B), (C), (D), (E), (F), (G), (H), (I), (J), (K), (L), and (M) of FIG. 6, with the attendant timing, voltage, and current expressions. This circuit is functionally identical to that of FIG. 7 and 7A save that the voltage (A), as expressed across the inductor L, is evolved by integration of T11 and T12 into a single low reluctance magnetic core structure. The inductor L retains a separate relatively higher reluctance magnetic core structure. Flux-summing of Ein as expressed across either $N_P$, and Eout as expressed across either non-corresponding $N_S$, produces the $N_T$ voltage(s) Ein minus Eout during the $t_{ON}$ intervals. Flux-summing of the simultaneous expression of Eout across each $N_S$ during the $(T/2-t_{ON})$ intervals produces the $N_T$ voltage(s), $-2Eout$. The magnetic integration and flux-summing techniques are well established in the power conversion discipline.

Figure 9:
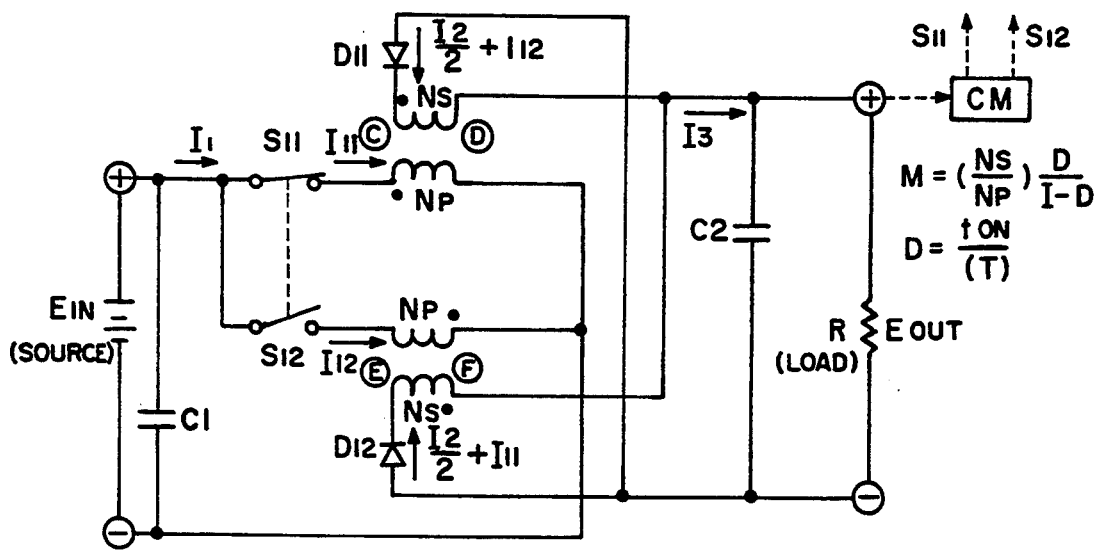
FIG. 9 illustrates schematically an isolated, single magnetic converter embodiment of the invention, with attendant voltage, current, and transfer function identities.
Figure 9A:
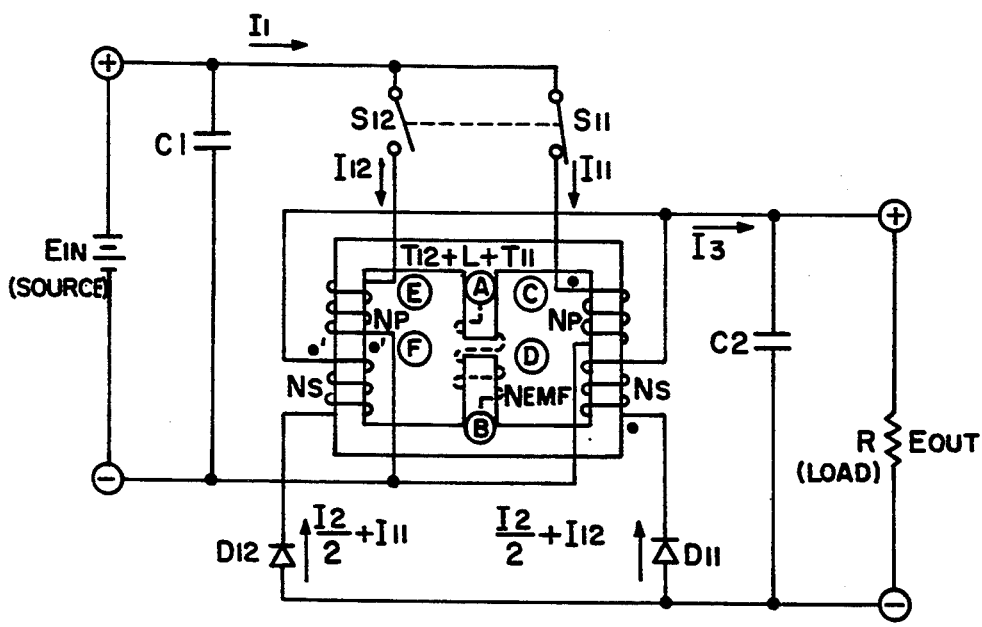
FIG. 9A illustrates the magnetic structure of FIG. 9, with attendant voltage and current identities.

4. Referring now to FIG. 9 and 9A, the timing, voltage and current identities are expressed in (T), (A), (B), (C), (D), (E), (F), (H), (I), (J), (K), (L), and (M) of FIG. 6, with the attendant timing, voltage, and current expressions. This circuit is functionally identical to that of FIG. 7 and 7A, save that the voltage (A), as expressed across the imaginary winding $N_{EMF}$, is now an analog of the ampere-turns (magnetomotive force) identity. The $N_L$ and $N_T$ windings are integrated into T11 and T12. The outer legs of the magnetic structure retain the low reluctance property. The relatively higher reluctance magnetic property of the inductor L is integrated into the magnetic structure center leg. The average of inductor current (G) is now $I_M$, the higher reluctance magnetic current, a composite of currents (I), (J), and (K). The magnetic integration and flux-summing techniques share the provenance of those of paragraph 3, as well as the two-bobbin derivation.

Figure 4:
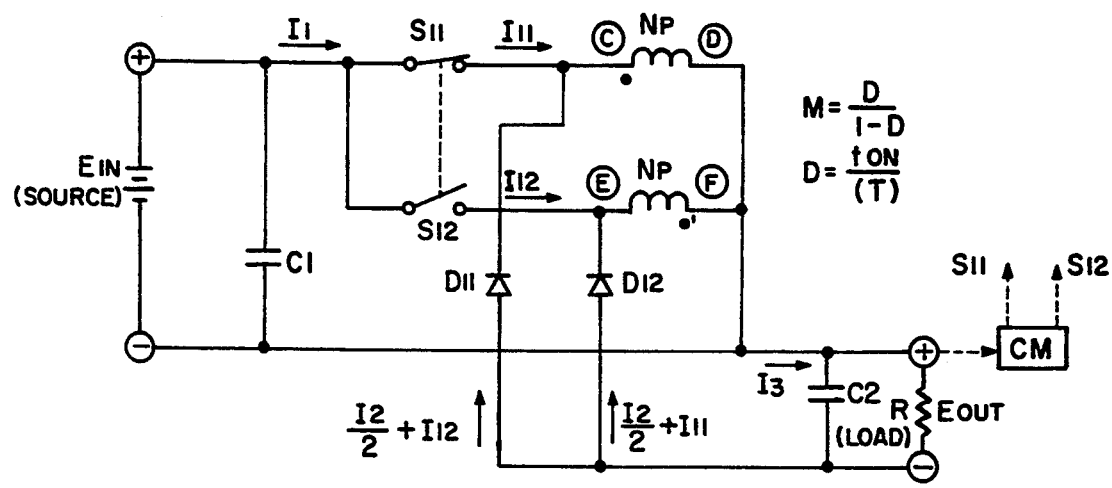
FIG. 4 illustrates schematically a non-isolated, single magnetic, converter embodiment of the invention, with attendant voltage, current, and transfer function identities.
Figure 4A:
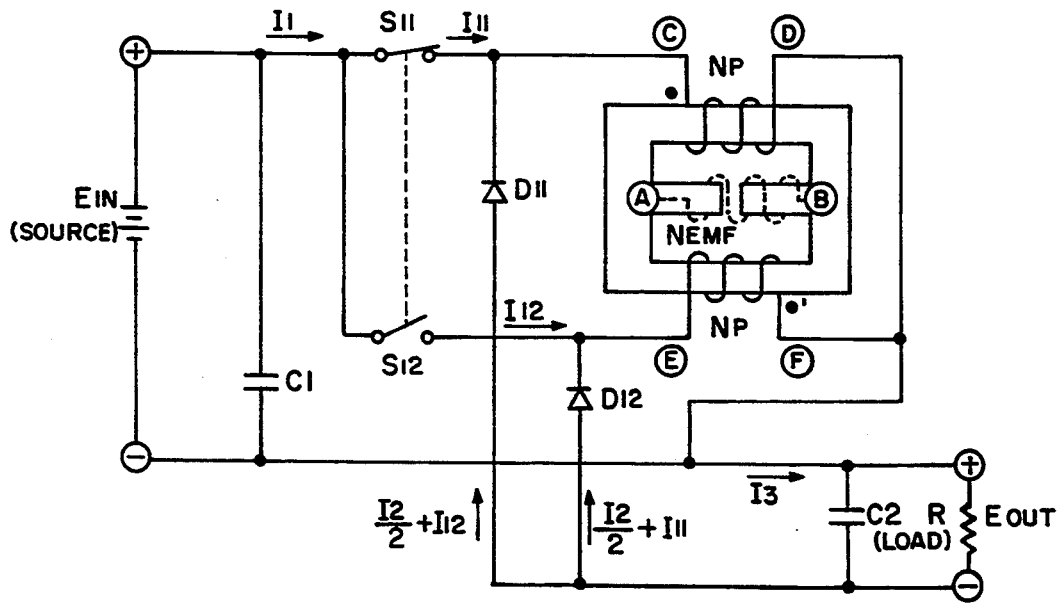
FIG. 4A illustrates the magnetic structure of FIG. 4, with attendant voltage and current identities.

5. Referring now to FIG. 4 and 4A, the timing, voltage and current identities are expressed in (T), (A), (B), (C), (D), (E), (F), (H), (I), (J), (K), (L), and (M) of FIG. 6, with the attendant timing, voltage, and current expressions. This circuit is functionally identical to the circuit of FIG. 9 and 9A, absent the $N_S$ windings in this non-isolated embodiment.

Figure 5:
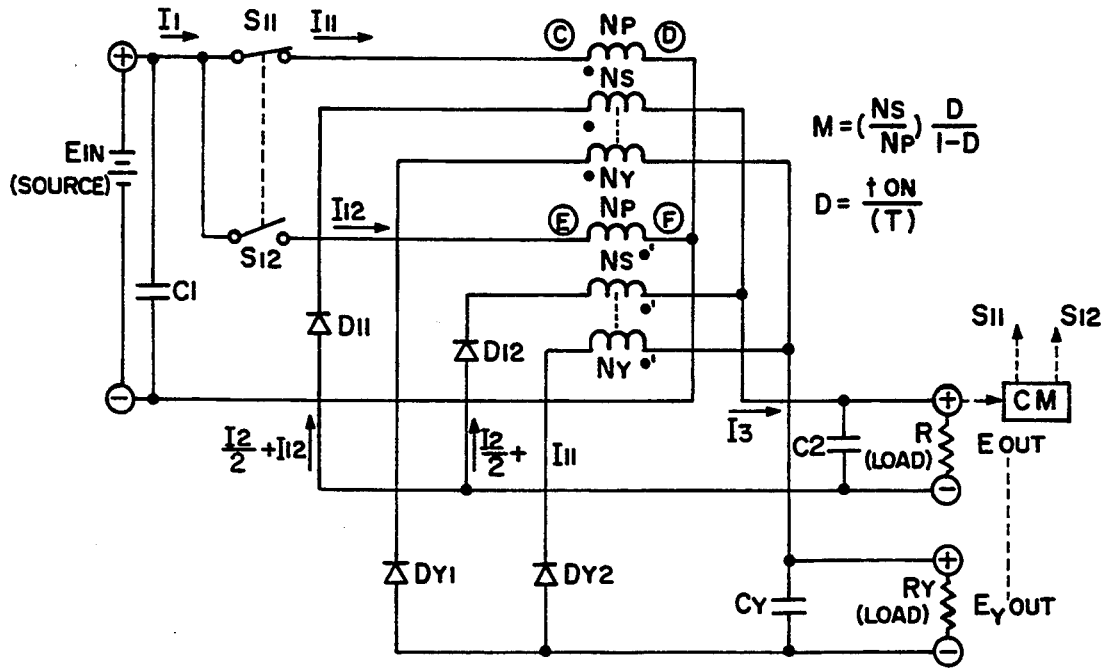
FIG. 5 illustrates schematically an isolated single magnetic, multiple output converter embodiment of the invention, with attendant voltage, current, and transfer function identities.
Figure 5A:
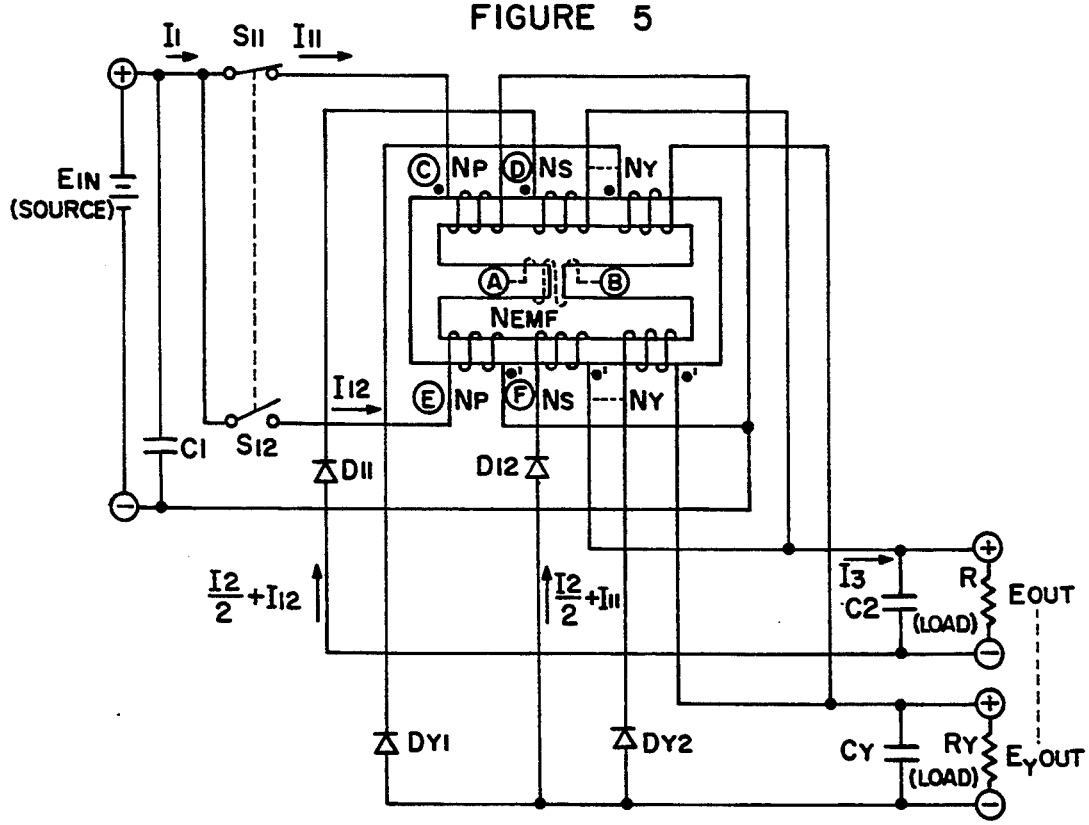
FIG. 5A illustrates the magnetic structure of FIG. 5, with attendant voltage and current identities.

6. Referring now to FIG. 5 and 5A, the timing, voltage and current identities are expressed in (T), (A), (B), (C), (D), (E), (F), (H), (I), (J), (K), (L), and (M) of FIG. 6, with the attendant timing, voltage, and current expressions. This circuit is functionally identical to the circuit of FIG. 9 and 9A, with the addition of the $N_y$ windings in this isolated, multiple output embodiment.

Figure 1:
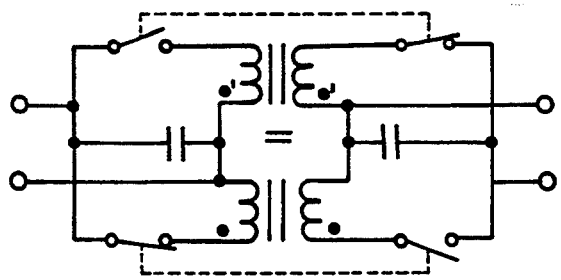
FIG. 1 illustrates the canonical form of the invention.
Figures 2A, 2B:
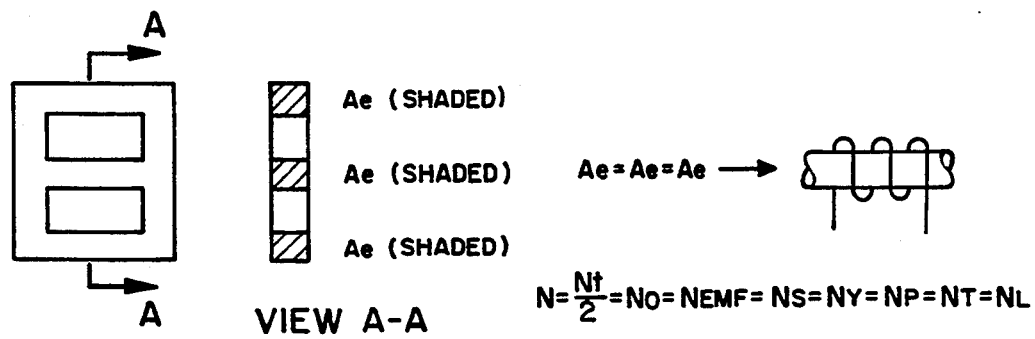
FIG. 2A illustrates the magnetic structural identities of FIG. 3A, 4A, 5A, 7A, 8A, and 9A.
FIG. 2B is a cross section of FIG. 2A taken along line A—A of FIG. 2A.

7. Referring now to FIG. 1, this circuit embodies the canonical form of the invention and is functionally independent of voltage polarities and source/load orientation. Single, two, three, and four quadrant mode function is evident.

8. The foregoing and other features of the invention (such as recited in the SUMMARY OF THE INVENTION) will be apparent to those skilled in the art upon reading this disclosure. It will be equally apparent that, for any given mode of operation, control means CM can be implemented in manifold ways. Also equally apparent is that the topology may be redeployed and augmented to functionally simulate all prior art full wave and polyphase circuit geometries, i.e., half-bridge, full-bridge, etc.

Other applications, variations, and ramifications of this invention will become apparent to those skilled in the art upon reading this disclosure. These appreciations are intended to be included within the scope of this invention, as defined in the appended claims.

What is claimed is:

1. A full wave buck-boost (flyback) converter topology, comprising:
   a DC source voltage having discontinuous source current;
   a first capacitor connected in parallel across said DC source voltage oriented to integrate said discontinuous source current;
   a utilization load;
   a DC output voltage expressed across said utilization load;
   a first power transformer including a primary, secondary, and tertiary winding, with a low reluctance magnetic core structure; a second power transformer including a primary, secondary, and tertiary winding, with a low reluctance magnetic core structure;
   a first switching means to selectively couple said DC source voltage and said first capacitor across the primary winding of said first power transformer;
   a second switching means to selectively couple said DC source voltage and said first capacitor across the primary winding of said second power transformer, said first and second switching means being simultaneously operated;
   a first unidirectional conducting means series connecting the secondary winding of said first power transformer with said utilization load and oriented to conduct during the non-conduction intervals of said first switching means;
   a second unidirectional conducting means series connecting the secondary winding of said second power transformer with said utilization load and oriented to conduct during the non-conduction intervals of said second switching means;
   an inductor, with a relatively higher reluctance magnetic core structure, connected in parallel across a series combination of the primary winding of said first power transformer with the tertiary winding of said second power transformer as well as a series combination of the primary winding of said second power transformer with the tertiary winding of said first power transformer, which paralleled series winding combinations are configured and polarized to express a voltage equal to said DC source voltage minus said DC output voltage during the alternate conduction intervals of said first and second switching means, while expressing a voltage equal to twice said DC output voltage during the simultaneous non-conducting intervals of said first and second switching means;
   a second capacitor connected in parallel across said utilization load, oriented to integrate the continuous output current product of said first capacitor, said first and second power transformers, said first and second switching means, said first and second unidirectional conducting means, and said inductor;
   a control means for selectively opening and closing said first and second switching means in order to effect full wave current transfer from said DC voltage source via said first capacitor, said first and second power transformers, said first and second unidirectional conducting means, said inductor, and said second capacitor to said utilization load, all responsive to a voltage transfer function $M = D/(1-D)$, in the full wave mode wherein M is represents the ideal voltage transfer ratio and D represents the switch closed period expressed as a fraction of a full wave cycle of operation expressed as an arbitrary time unit of one.

2. The converter of claim 1 wherein said first and second power transformers are integrated into a single low reluctance magnetic core structure, said inductor retaining a separate relatively higher reluctance magnetic core structure.

3. The converter of claim 1 wherein said first and second power transformers and said inductor are integrated into a single magnetic core structure with, respectively, both low and relatively higher reluctance properties.

4. A continuous mode, full wave, buck-boost, PWM controlled, fixed frequency, switch-mode power converter topology comprising a DC source voltage having discontinuous source current; a utilization load; a single flux permutation medium is so interposed between alternating DC source voltage to utilization load switching means as to simultaneously provide both a canonical buck-boost converter voltage transfer function, $M=D/(1-D)$, and the characteristic full wave buck converter inductor current coupling properties of being source voltage continuous during the alternate D intervals, source discontinuous during the simultaneous $(1-D)$ intervals, and utilization load continuous during both the alternate D and the simultaneous (1-D) intervals wherein M is represents an ideal voltage transfer ratio and D represents a switch closed period expressed as a fraction of a full wave cycle of operation expressed as an arbitrary time unit of one.

* * * * *